Figure 1:
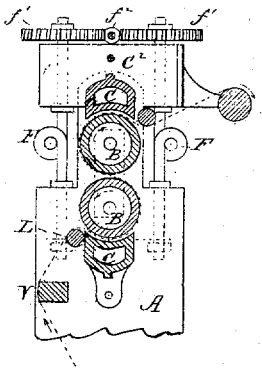

E. GESSNER.

Machine for Pressing Cloth.

No. 9,077. Reissued Feb. 17, 1880.

WITNESSES:

W. W. Hollingsworth

Edw. W. Byrne.

INVENTOR:

Ernst Gessner

BY Munn & Co.

ATTORNEYS.

THE NORRIS PETERS CO., PHOTO-LITHO., WASHINGTON, D. C.

UNITED STATES PATENT OFFICE.

ERNST GESSNER, OF AUE, SAXONY, GERMANY.

MACHINE FOR PRESSING CLOTH.

SPECIFICATION forming part of Reissued Letters Patent No. 9,077, dated February 17, 1880.

Original No. 206,718, dated August 6, 1878. Application for Reissue filed December 11, 1879.

DIVISION B.

*To all whom it may concern:*

Be it known that I, ERNST GESSNER, of Aue, in the Kingdom of Saxony, Empire of Germany, have invented a new and useful Improvement in Machines for Pressing Cloth; and I do hereby declare that the following is a full, clear, and exact description of the same.

This invention relates to improved machinery for hot-pressing and finishing woven, felted, and other fabrics; and it is an improvement upon that general form of machine in which a hollow steam-heated press-box smooths and presses the cloth between its curved inner surface and the periphery of an adjacent cylinder.

The improvement consists in combining with a set of two or more cylinders revolving together a set of press-boxes arranged to bear upon opposite sides of the set of cylinders or parts most remote from each other, so as to press the cloth upon both sides at one operation and cause the pressing strain to be equalized on both sides.

The invention also consists in connecting the several press-boxes of any one cylinder together by a piece of thin metal for the continuous and smooth passage of the cloth without folding, wrinkling, or tearing, as hereinafter fully described.

As the features herein embodied only relate to the arrangement and adjustment of the press-boxes and cylinders, I have not considered it necessary to show in the drawings a full-size machine, since the general construction and arrangement of the same can be seen in Figures 1, 2, 4, and 5 of Division A of this reissue.

The figures in the accompanying drawings represent the several modifications of my invention which I employ, the views being taken in vertical section transversely through the cylinders and press-boxes.

In Fig. 1, A is the standard or end frame, and $C^2$ a cross-head located at each end of the cylinders, and between which the cylinders B B and press-boxes C C are arranged in vertical position, the two cylinders being arranged to revolve together and against each other, while the press-boxes, which are backed, respectively, by the end frame, A, and cross-heads $C^2$, press upon the opposite or remote sides of the cylinders. This arrangement gives the cloth two successive pressings upon its two opposite sides, and in its travel it passes first over the bar V to roller L, then between the lower cylinder and press-box to be pressed upon one side; then, after passing half-way around the lower cylinder, it is transferred to the upper one and passes between the upper cylinder and the top press-box to be pressed upon the other side, after which it is led off to any suitable place.

It will thus be seen that the cloth will receive two successive hot-pressings, one upon each side, and the great strain of the press-boxes is neutralized by the opposite arrangement of the same.

Figure 2:
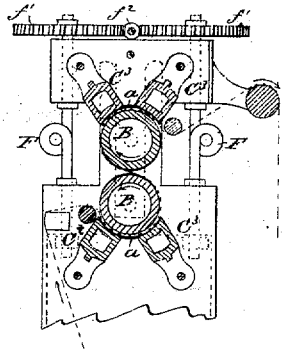

In Fig. 2 there are two cylinders, B B, arranged to revolve together, the one above the other, each of which cylinders has two diagonally-arranged press-boxes, $C^3$ $C^3$, the two press-boxes of each cylinder being connected by a sheet-metal plate, (shown by the short thick line at *a*.) The cloth in this machine follows the same curve as in Fig. 1, and the result of two successive hot-pressings on opposite sides of the cloth with the equalized strain is attained in substantially the same manner.

Figure 3:
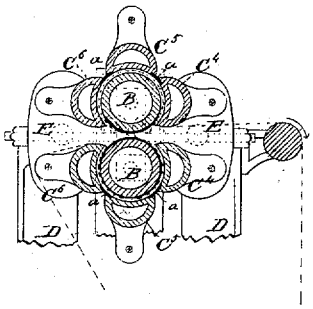

In Fig. 3 the two cylinders B B are arranged to revolve together, one above the other, and three press-boxes, $C^4$ $C^5$ $C^6$, are arranged to bear upon each cylinder at all points except where the cylinders approach each other, the passage from box to box being made continuous by the sheet-metal plates *a a*. In this case the highest and lowest boxes $C^5$ $C^5$ press vertically, while the horizontally-acting boxes $C^4$ and $C^6$ are pivoted in frames E on each side, which frames are in turn loosely connected with the upper ends of arms D, pivoted at the bottom, as in Fig. 1 of Division A of the reissue. The passage of the cloth and the two hot-pressings and equalized strain are attained in this machine in a similar manner to the foregoing.

Figure 4:
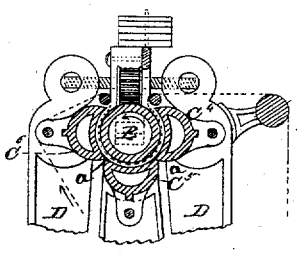

In some cases I may wish to employ, in connection with a rotating pressing-surface, two or more press-boxes connected by the metal plate *a*, without special regard to the duplication of cylinders, and for this purpose the construction shown in Fig. 4 may be made use of. I would state in this connection, however, that I only claim in this application the specific connection of the boxes by the plate *a* when said boxes are arranged to press more or less at right angles against or upon the same semi-circumference of a rotating pressing-surface, since the diametrical pressing-boxes, with the cylinder and curved guide for carrying the cloth from one box to the other, are claimed, broadly, in Division A of this reissue.

In adjusting the pressure of the boxes against the cylinders I employ four springs, F, which connect the standards A with the cross-heads $C^2$ with a tension which is regulated by screw-nuts, which are turned by the worm-wheels $f'$ and the worm $f^2$ on a horizontal shaft, the connection being such as to give an equal adjustment to all of said springs for an equal pressure on all parts of the boxes.

The means for adjusting the pressure of the boxes shown in Figs. 3 and 4 I do not claim in this application, as the same is covered in Division A.

Having thus described my invention, what I claim as new is—

1. The combination, with a set of cylinders and mechanism whereby said cylinders are caused to revolve together, as described, of press-boxes and means for causing the same to bear upon opposite sides of the set of cylinders, or at points most remote from each other, to press the cloth upon both sides in one operation and equalize the strain, as described.

2. The combination, with a set of cylinders and mechanism whereby said cylinders are caused to revolve together as described, of a set of press-boxes and means for causing the same to bear upon the opposite sides of the set of cylinders or points most remote from each other, the said press-boxes of each cylinder being connected by metal plates for continuing the smooth passage of the cloth from press-box to press-box, as described.

3. The combination, with a pressing-surface and means for revolving the same, substantially as described, of independent press-boxes arranged to press on the same semi-circumference, and connected by the separate sheet-metal plates *a*, and means for pressing said boxes against the revolving surface, substantially as and for the purpose described.

4. The press-boxes and cylinders, and means for pressing said boxes against the cylinders and for revolving the cylinders, the standards A and cross-heads $C^2$, the springs F, the worm-wheels $f'$, having screw-threaded connection with said springs, and the worms $f^2$, all combined as shown and described, for a uniform adjustment of pressure.

The above specification of my invention signed by me this 17th day of July, 1879.

ERNST GESSNER.

Witnesses:

ALFRED NOEZOLD,
FRANZ EBERT.